US012767431B2

(12) United States Patent
Swenson

(10) Patent No.: US 12,767,431 B2
(45) Date of Patent: Oct. 20, 2026

(54) CONTAINER LID SUPPORT

(71) Applicant: Mark Everett Swenson, Camas, WA (US)

(72) Inventor: Mark Everett Swenson, Camas, WA (US)

( * ) Notice: Subject to any disclaimer, the term of this patent is extended or adjusted under 35 U.S.C. 154(b) by 0 days.

(21) Appl. No.: 19/398,190

(22) Filed: Nov. 24, 2025

(65) Prior Publication Data

US 2026/0145871 A1 May 28, 2026

Related U.S. Application Data

(60) Provisional application No. 63/724,474, filed on Nov. 25, 2024.

(51) Int. Cl.
*B65F 1/16* (2006.01)
*B65F 1/02* (2006.01)

(52) U.S. Cl.
CPC .................. *B65F 1/16* (2013.01); *B65F 1/02* (2013.01); *B65F 2001/1669* (2013.01)

(58) Field of Classification Search
CPC ....... B65F 1/16; B65F 1/02; B65F 2001/1669
See application file for complete search history.

(56) References Cited

U.S. PATENT DOCUMENTS 498,569 A 5/1893 Peterson
3,902,631 A * 9/1975 Gatto .................... B29C 48/916 220/212.5
4,186,844 A 2/1980 Swanson
4,915,433 A 4/1990 Schafer
5,085,341 A 2/1992 Hodge
5,595,317 A 1/1997 Hodge
7,100,791 B2 9/2006 Berger
(Continued)

FOREIGN PATENT DOCUMENTS

DE 20108480 U1 * 1/2002 ................ B65F 1/16
DE 202012012214 U1 * 2/2013 ................ B65F 1/16
(Continued)

OTHER PUBLICATIONS

Translation of DE 202018003934 provided by Espacenet. (Year: 2026).*
(Continued)

*Primary Examiner* — James N Smalley
(74) *Attorney, Agent, or Firm* — Kintner IP, LLC; Mary Frances Ludwig

(57) ABSTRACT

A container lid support is removably attachable to a container, easily installed and adjusted, and does not damage or modify the container. Embodiments of the support are designed for use with roller-type trash cans commonly used for residential waste pick up. The support may be located on a handle of the trash can and may provide a resting point for the trash can lid when the lid is in an open position. A body of the support is configured to receive the handle. An arm extends upwardly from the body and is angled rearwardly away from vertical; the arm terminates in an arm end to contact and support the lid when in an open position. In some aspects, components of the support, such as a leg or a foot, are adjustable to provide secure engagement with the container and accommodate various container sizes and shapes.

20 Claims, 11 Drawing Sheets

(56) References Cited

U.S. PATENT DOCUMENTS

| | | | | |
|---|---|---|---|---|
| 9,233,793 | B1 | 1/2016 | Jackson et al. | |
| 9,580,243 | B2 | 2/2017 | Reeb | |
| 9,718,616 | B1 * | 8/2017 | Deming ................ | B65F 1/1646 |
| 10,647,505 | B2 * | 5/2020 | Sherrard ............... | B65F 1/1615 |
| 2009/0250463 | A1 * | 10/2009 | Van Risseghem ...... | B65F 1/163 220/263 |
| 2011/0309218 | A1 | 12/2011 | M. Carter Alston Waters | |
| 2015/0298904 | A1 * | 10/2015 | Sherrard ............... | E05F 1/1083 16/73 |

FOREIGN PATENT DOCUMENTS

| | | | | | |
|---|---|---|---|---|---|
| DE | 202013006936 | U1 * | 8/2013 | ................ | B65F 1/16 |
| DE | 202018003934 | U1 * | 10/2018 | ............ | B65F 1/1646 |
| GB | 2304807 | A * | 3/1997 | ................ | B65F 1/16 |
| WO | WO-2023023720 | A1 * | 3/2023 | ............ | B65F 1/1623 |

OTHER PUBLICATIONS

Translation of DE 202012012214 provided by Espacenet. (Year: 2026).*

* cited by examiner

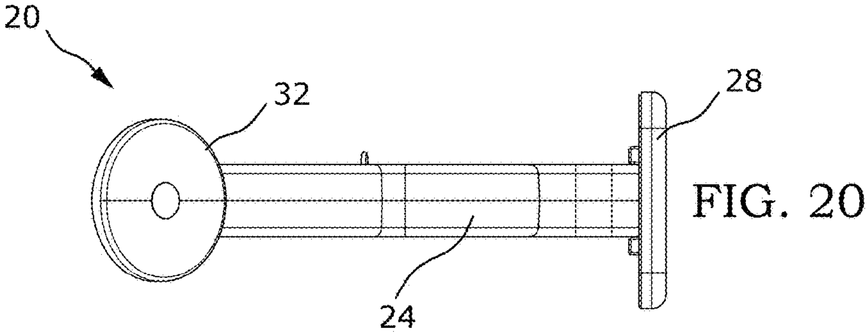
FIG. 20
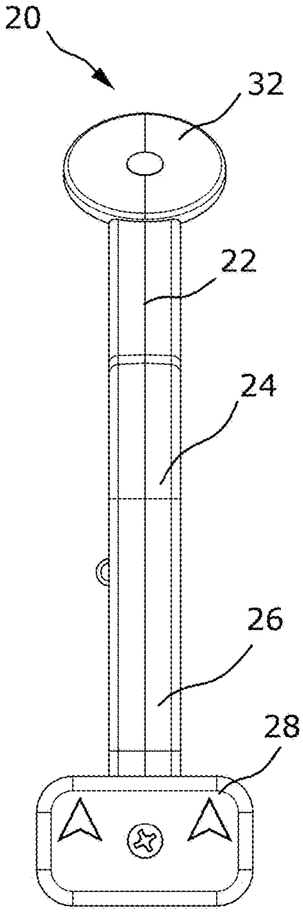
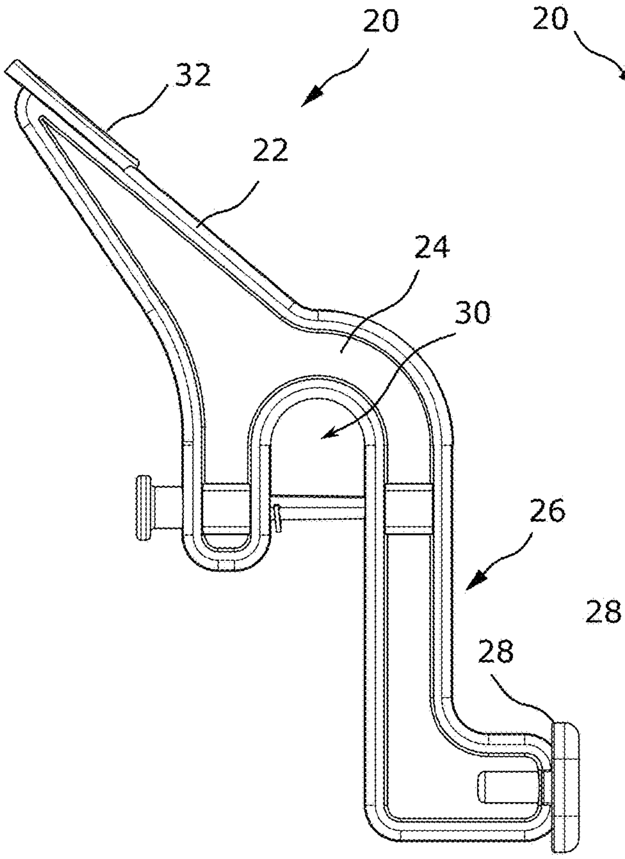
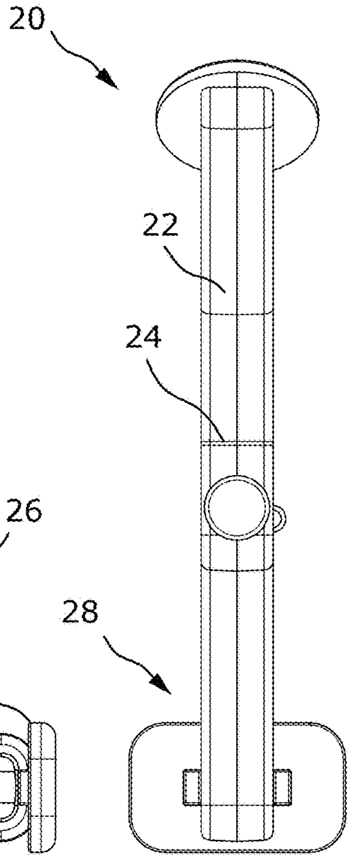
FIG. 18
FIG. 17
FIG. 19
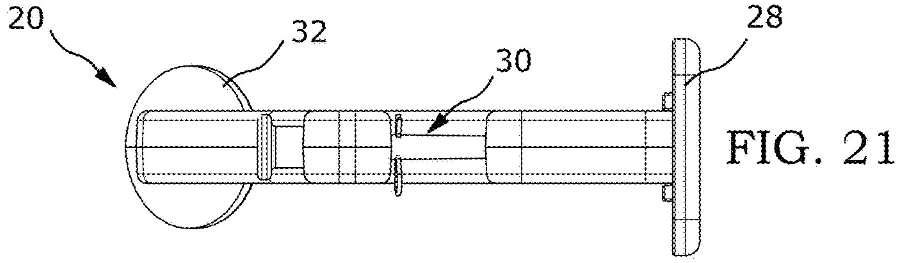
FIG. 21

CONTAINER LID SUPPORT

CROSS REFERENCE TO RELATED APPLICATION

This application claims the benefit of U.S. Provisional Application No. 63/724,474, filed Nov. 25, 2024, which is hereby incorporated by reference in its entirety.

TECHNICAL FIELD

The present invention pertains generally to containers having lids, and more particularly to container lid supports for attachment to a container, systems including containers and lid supports, and methods of supporting container lids.

BACKGROUND OF THE INVENTION

Containers commonly used for residential trash have a lid which is opened by pivoting about a handle located at the rear of the container. A user holding trash bags or other items may have difficulty opening the lid. If the lid is only partially raised, it may fall down toward the user while they are putting trash into the container. This scenario has the potential to cause injury, undesirable bodily contact with the lid (e.g., the lid may hit a user's head or arm), and/or may cause the user to spill trash. If the lid is fully opened, it may either pivot toward the rear of the container, where it is in an inconvenient location to access for closing, or it may rest on a nearby object such as a fence or wall. Due to the size and weight of the lid, it may damage objects, such as siding or trim, which it may hit when opening.

There is a need for a device to maintain a container lid in an open position for a user to access the container. Since many residential trash cans are owned by a municipality or service company, the device would preferably be installed without modification to the container. In addition, the device should not interfere with or be damaged by the container being lifted by an articulated arm of a sanitation vehicle.

BRIEF SUMMARY

The present disclosure is directed to a container lid support which is removably attachable to a container, easily installed and adjusted, and does not damage or modify the container. Embodiments of the support are designed primarily for use with roller-type trash cans commonly used for residential waste pick up. The support may be centrally located on a handle of the trash can and may provide a resting point for the trash can lid when the lid is in an open position. Providing a stop position for the lid to open and rest against makes it easier to dump trash into the container. The support rest is rearwardly offset from the vertical position, which decreases the likelihood of the lid falling forward and hitting the user's body, potentially causing injury, unsanitary contact with the lid, or spillage of trash.

According to one or more examples, a container lid support is configured for attachment to a cooperating container having a handle, a lid, and a back. The container lid support may include: a body having a recess shaped and dimensioned to receive the handle of the container; an arm extending upwardly from the body and angled rearwardly away from a vertical direction; an arm end located on a distal end of the arm, the arm end structurally configured to contact and support the lid of the container when the lid is in an open position; a leg extending downwardly from the body; and a foot projecting forwardly from a distal end of the leg, the foot configured to contact the back of the container.

According to one or more examples of the container lid support, the arm may be adjustably positionable over a range of angles offset rearwardly from the vertical direction. According to one or more examples of the container lid support, the arm may be adjustably positionable continuously over the range of angles. According to one or more examples of the container lid support, the arm may be adjustably positionable between about 20 degrees and about 60 degrees offset rearwardly from the vertical direction. According to one or more examples of the container lid support, the arm may be adjustably positionable to a plurality of discrete positions within the range of angles.

According to one or more examples of the container lid support, the arm may include a plurality of holes at a lower end thereof, each of the plurality of holes being configured to receive a pin for adjustably positioning the arm at the plurality of discrete positions.

According to one or more examples of the container lid support, the body may include detents configured to engage with the arm for adjustably positioning the arm at the plurality of discrete positions.

According to one or more examples of the container lid support, the arm may be angled rearwardly away from the vertical direction by an angle of between about 30 degrees and about 60 degrees.

According to one or more examples of the container lid support, the foot may be adjustably positionable in a lateral direction to contact the back of the container.

According to one or more examples of the container lid support, the foot may include a biasing mechanism configured to extend the foot to contact the back of the container.

According to one or more examples, the container lid support may include a retractable retainer located on the body, the retractable retainer positionable to a first position at least partially blocking the recess and a second position wherein the recess is sufficiently open for the handle to pass therethrough.

According to one or more examples of the container lid support, the leg may be adjustably positionable to change a length thereof.

According to one or more examples of the container lid support, the leg may include a plurality of holes configured to receive a pin for adjustably positioning the leg at discrete lengths.

According to one or more examples of the container lid support, the recess may be substantially U-shaped and dimensioned to closely receive the handle.

According to one or more examples of the container lid support, the body may be rotatably positionable about the handle when attached thereto.

According to one or more examples of the container lid support, the arm end may include one or more of rubber, padding, and a shock resistant material.

According to one or more examples of the container lid support, the body, the arm, and the leg may create a unitarily formed structure. According to one or more examples of the container lid support, the unitarily formed structure is retained in position solely by interaction of the body, foot, and recess such that the support remains secured to the handle during normal use without additional fasteners or retaining mechanisms.

According to one or more examples, the container lid support may have a maximum width smaller than a passage width defined between the handle and the back of the container.

According to one or more examples, a container lid support may be configured for attachment to a cooperating container having a handle, a lid, and a back. The container lid support may include: a body having a recess shaped and dimensioned to receive the handle of the container; an arm extending upwardly from the body and adjustably positionable over a range of angles offset rearwardly from the vertical direction; an arm end located on a distal end of the arm, the arm end structurally configured to contact and support the lid of the container when the lid is in an open position; a leg extending downwardly from the body and adjustably positionable to change a length thereof; and a foot projecting forwardly from a distal end of the leg, the foot including a biasing mechanism configured to extend the foot to contact the back of the container.

According to one or more examples, a container system may include: a container having a handle, a lid, and a back, the lid pivotable about the handle to an open position; a container lid support including: a body having a recess shaped and dimensioned to receive the handle; an arm extending upwardly from the body and angled rearwardly away from a vertical direction; an arm end located on a distal end of the arm, the arm end structurally configured to contact and support the lid of the container when the lid is in the open position; a leg extending downwardly from the body; and a foot projecting forwardly from a distal end of the leg and in contact with the back of the container.

According to one or more examples, a method of supporting a lid of a container may include: providing a container lid support connected to a handle of the container with an arm of the support extending upwardly and a leg of the support extending downwardly; contacting a back of the container with a foot of the support; pivoting the lid about the handle into an open position; and bringing the lid in contact with an arm end located on a distal end of the arm, thereby supporting the lid of the container in the open position.

According to one or more examples of the method, connecting the container lid support to the handle may include: positioning the support in a first orientation with the arm projecting toward a first side of the container and the foot projecting toward an opposing second side of the container; passing the support in the first orientation between the handle and the back of the container; rotating the support into a second orientation with the arm projecting toward a rear of the container and the foot projecting toward a front of the container; and receiving the handle within a recess of the support.

According to one or more examples, the method may further include: rotating the support about the handle to contact the lid with the lid in a closed position.

According to one or more examples, the method may further include: adjusting the position of the arm over a range of angles offset rearwardly from a vertical direction.

According to one or more examples, the method may further include: adjusting the position of the foot in a lateral direction.

According to one or more examples, the method may further include: adjusting the position of the leg to change a length of the leg.

These and other aspects of the embodiments will be better appreciated and understood when considered in conjunction with the following description and the accompanying drawings. The following description, while indicating various embodiments and details thereof, is given by way of illustration and not of limitation. Many substitutions, modifications, additions, or rearrangements may be made within the scope of the embodiments, and the embodiments may include all such substitutions, modifications, additions, or rearrangements.

BRIEF DESCRIPTION OF THE DRAWINGS

Non-limiting and non-exhaustive embodiments of the container lid support are described with reference to the following figures, wherein like reference numerals refer to like parts throughout the various views unless otherwise specified.

FIG. 17 is a left side view of the container lid support, the right side view being substantially a mirror image.

FIG. 18 is a front view of the container lid support.

FIG. 19 is a rear view of the container lid support.

FIG. 20 is a top view of the container lid support.

FIG. 21 is a bottom view of the container lid support.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. Also, common but well-understood elements that are useful or necessary in a commercially feasible embodiment are often not depicted in order to facilitate a less obstructed view of these various embodiments.

DETAILED DESCRIPTION

The detailed description describes non-limiting exemplary embodiments. Any individual features may be combined with other features as required by different applications for at least the benefits described herein.

In the present disclosure, many features are described as being optional, e.g. through the use of the verb "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features, or with all three of the three possible features.

As used herein, the term "about" means plus or minus 10% of a given value unless specifically indicated otherwise. As used herein, the terms "substantially" or "substantially the same" mean that two items are at least 90% the same; for example, a feature described as "substantially parallel" may be parallel to within 90%, an element described as "substantially circular" may be circular to within 90%, and so on.

As used herein, the conjunction "or" is to be construed inclusively (e.g., "A or B" would be interpreted as "A, or B, or both A and B"; e.g., "A, B, or C" would be interpreted as "A; or B; or C; or any two of A, B, and C; or all three of A, B, and C").

As used herein, disclosure of a singular element is also a disclosure of a plural element and vice versa unless otherwise noted.

Figure 1:
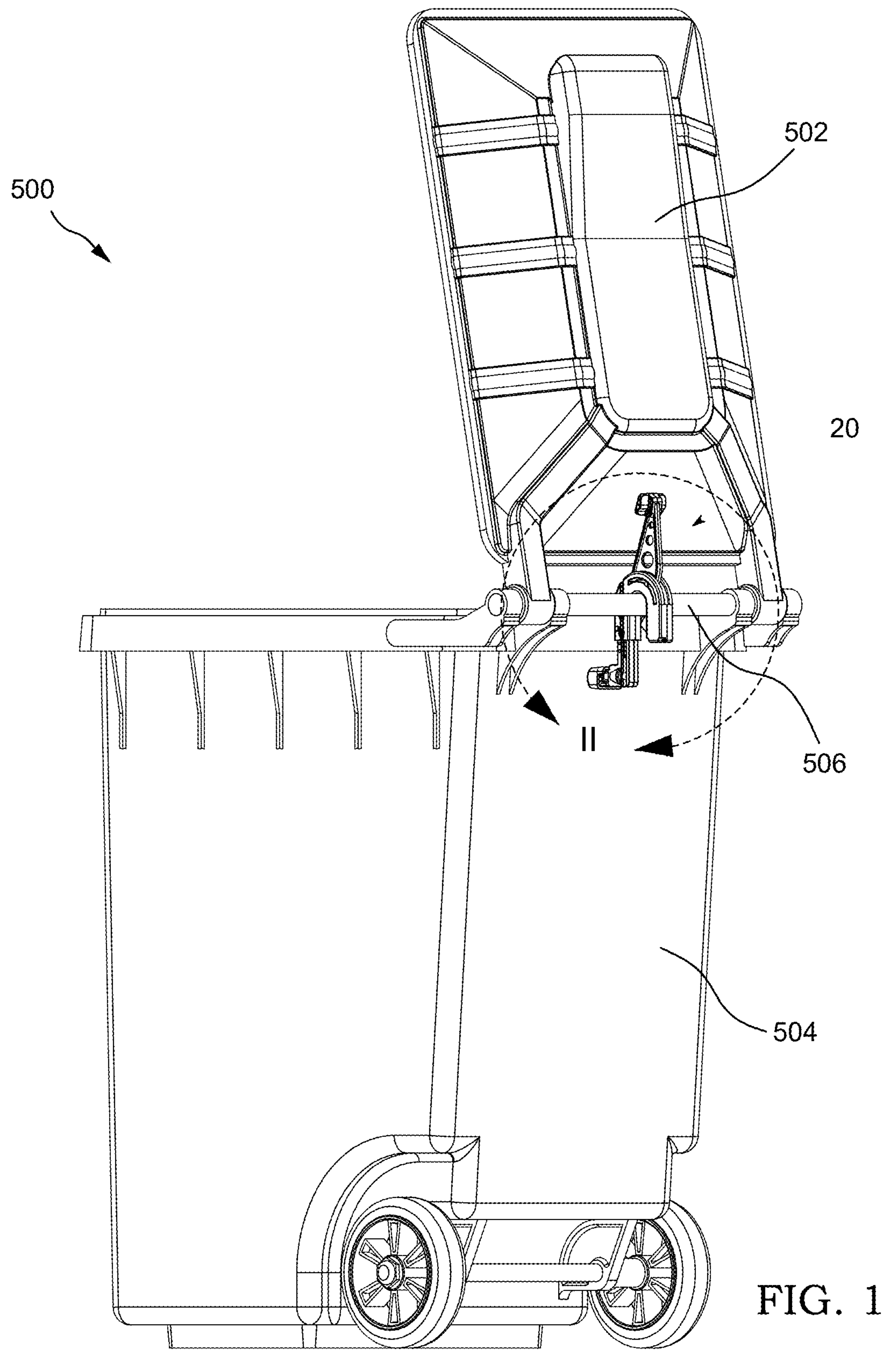
FIG. 1 is a reduced perspective view of an embodiment of a support for a container lid, shown in use with a cooperating trash can.
Figure 2:
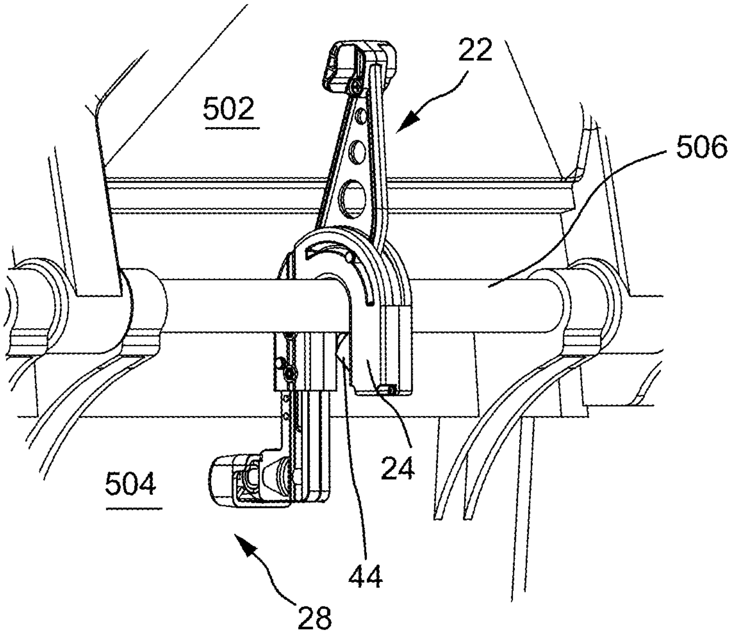
FIG. 2 is an enlarged view of region II of FIG. 1.
Figure 3:
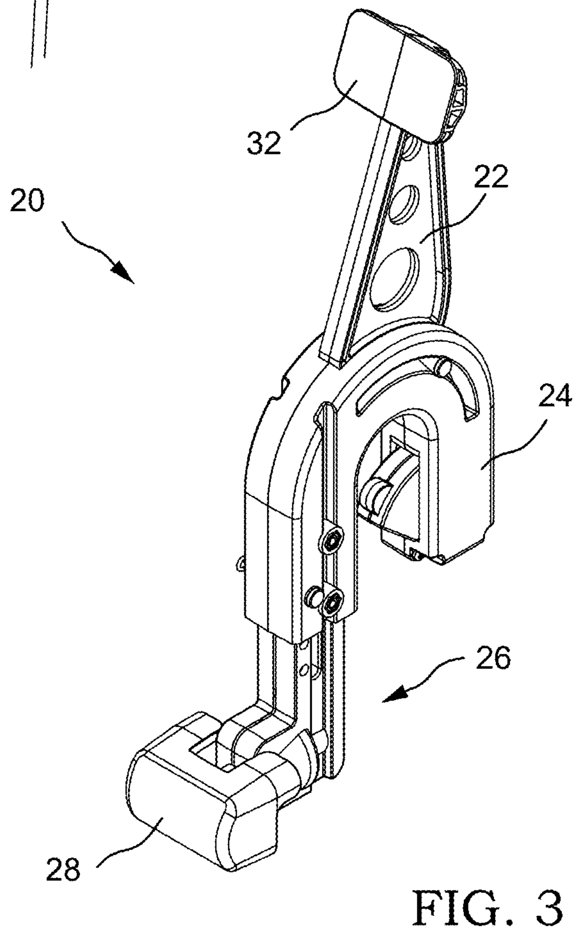
FIG. 3 is a front perspective view of a container lid support.
Figure 7:
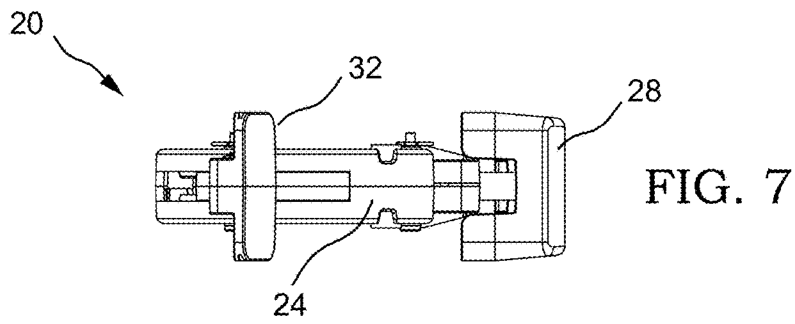
FIG. 7 is a top view of the container lid support.
Figure 5:
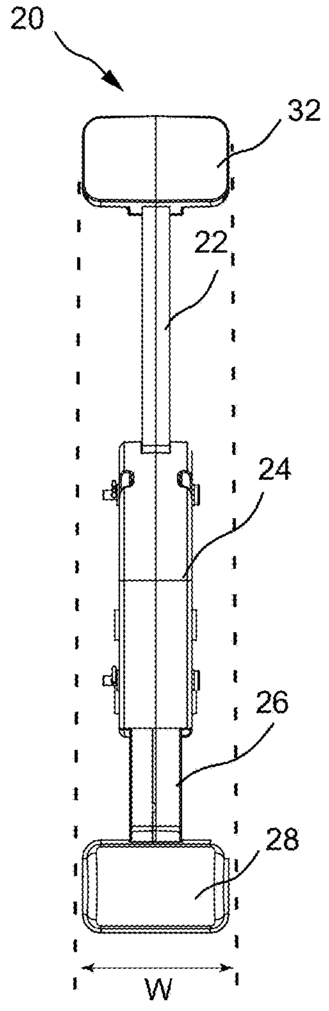
FIG. 5 is a front view of the container lid support.
Figure 4:
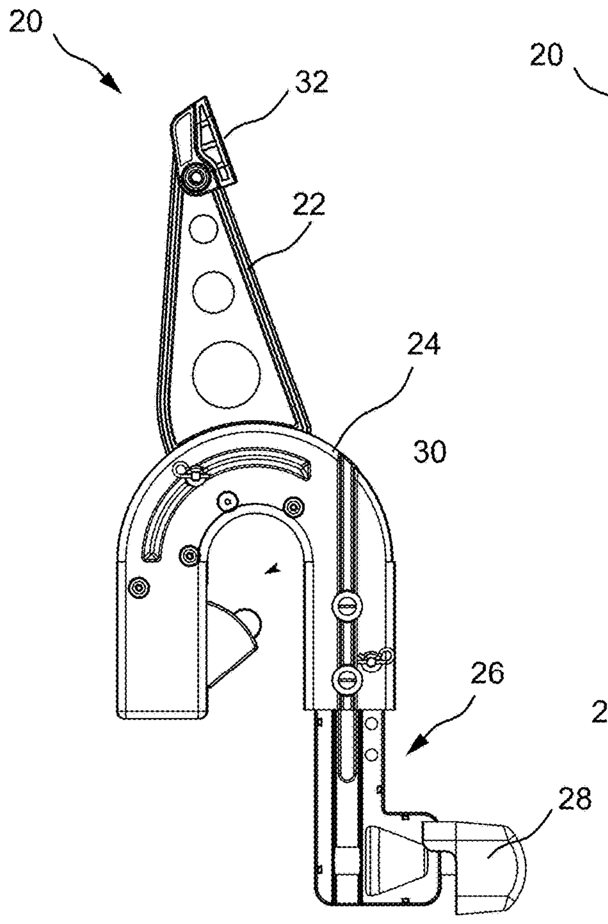
FIG. 4 is a left side view of the container lid support.
Figure 6:
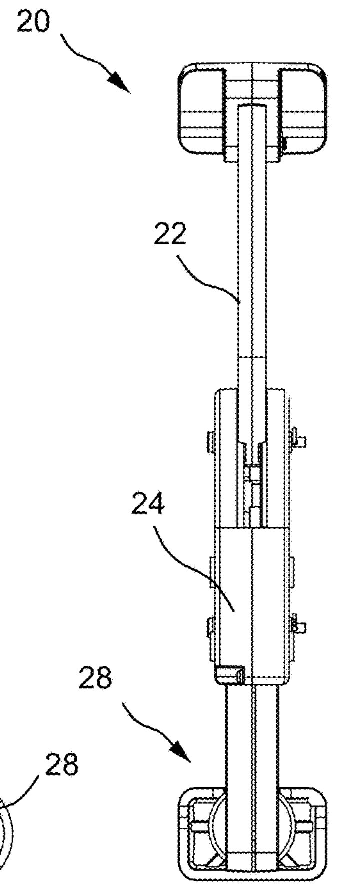
FIG. 6 is a rear view of the container lid support.
Figure 8:
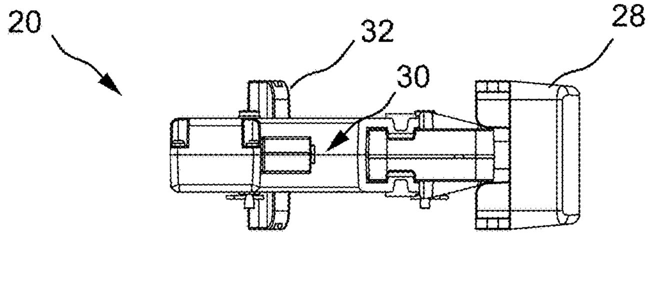
FIG. 8 is a bottom view of the container lid support.

Referring initially to FIG. 1, there is illustrated a reduced perspective view of an embodiment of a support for a container lid, the support generally designated 20. FIG. 2 is an enlarged view of region II of FIG. 1. Support 20 is shown in use with a cooperating trash can 500, having a lid 502, a back 504, and a handle 506 about which lid 502 may pivot for opening and closing. The shown trash can 500 is of the roller-type commonly used for residential waste. A skilled artisan will appreciate that the support 20 may be adapted for use with other types of containers, such as, e.g., recycling bins, compost containers, outdoor storage bins, commercial waste receptacles, or any container having a hinged lid and rear-mounted handle.

As used herein the terms 'front' or 'forward' refer to the direction of the container front (e.g. the accessible side which the lid opens away from); the terms 'back' or 'rearward' refer to the face of the container which the container lid opens toward. In the case of a roller-type trash can the handle is generally located in the rear.

FIGS. 3-8 are, respectively, front perspective, left side, front, rear, top, and bottom views of the FIG. 1 embodiment of support 20. Support 20 has a body 24 configured to receive handle 506 (see, e.g., FIG. 2). An arm 22 extends upwardly from body 24, and is angled rearwardly away from vertical (e.g., away from the dashed vertical line shown in FIG. 9). The arm terminates in an arm end 32 which is configured to support lid 502 in an open position. In the shown embodiment, arm end 32 has a flat surface designed to contact the container lid. In some embodiments, arm end 32 may be padded. In other embodiments, arm end 32 may be shaped to compliment the shape of lid 502.

In use, body 24 of support 20 may be placed over handle 506 of the trash can. Body 24 may have a recess 30 shaped and configured to receive handle 506. In the shown embodiment, handle 506 is a substantially cylindrical rod and recess 30 is generally U-shaped and dimensioned to closely receive the handle. In some embodiments, body 24 may include a mechanism for retaining the support in place on the handle as further discussed below.

One method of installing the support on the handle involves positioning the support substantially orthogonally to its intended use position (i.e. with the foot projecting toward one side of the container and the arm projecting toward the opposite side of the container), passing support 20 between handle 506 and back 504 of the container, and rotating support 20 about 90 degrees into the use position with the handle being received by recess 30. To enable this method, the support may have a width 'W' (see FIG. 5) narrower than the gap between the handle and the back of the container. When installed, the support may rotate about the handle to the extent permitted by leg 26 and arm 22. For example, when not in use the support may be rotated so that arm end 32 contacts lid 502 when the lid is in a closed position.

Support 20 includes a leg 26 extending downwardly from body 24 and terminating in a foot 28. Foot 28 projects forwardly, and is configured to contact back 504 of the container (see FIG. 2), providing further stability to the support. In embodiments, foot 28 may be padded. Foot 28 may be formed of a resilient material such as rubber.

Figure 9:
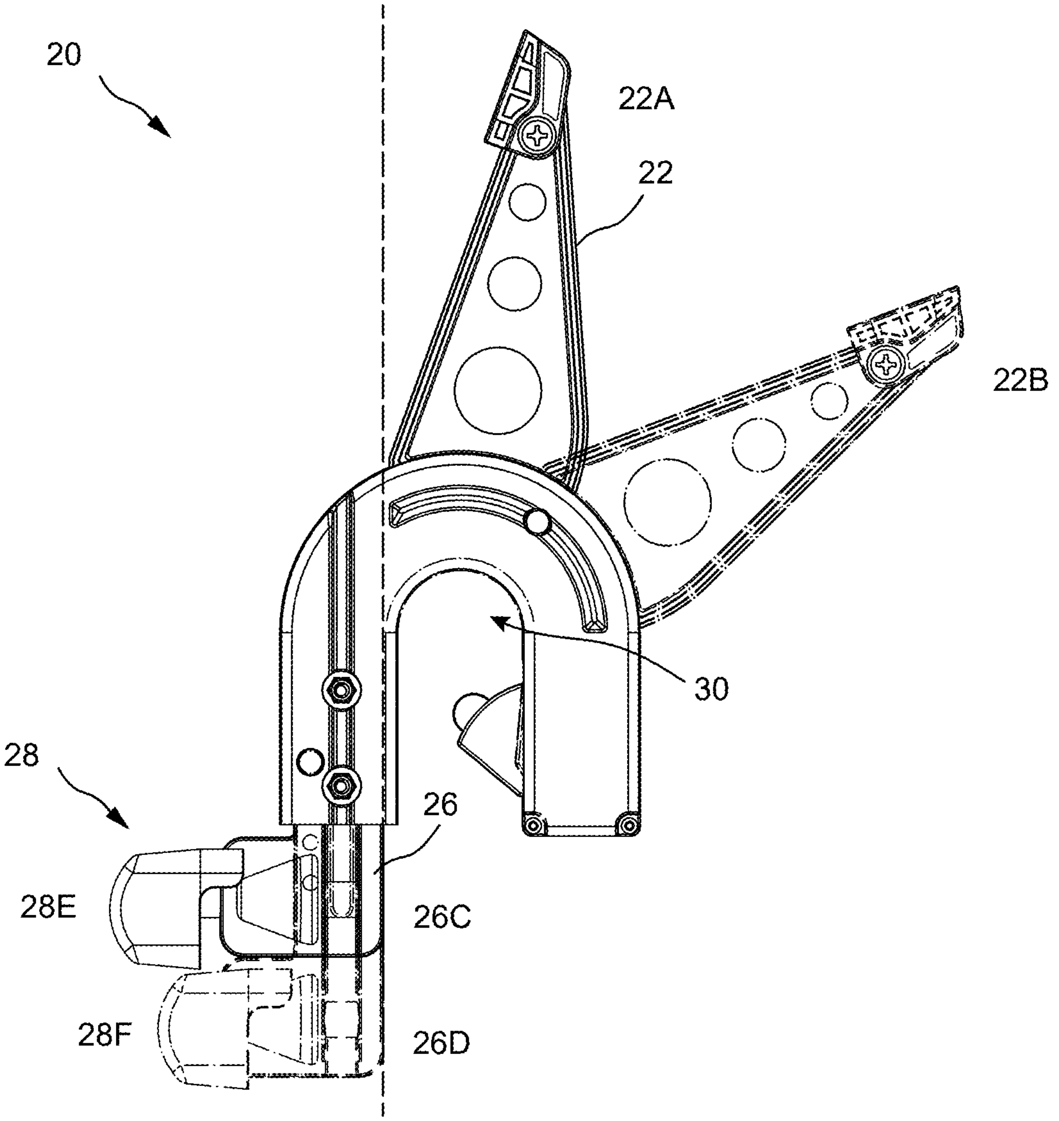
FIG. 9 is an enlarged right side view of the container lid support, showing alternate positions of features of the support.
Figure 10:
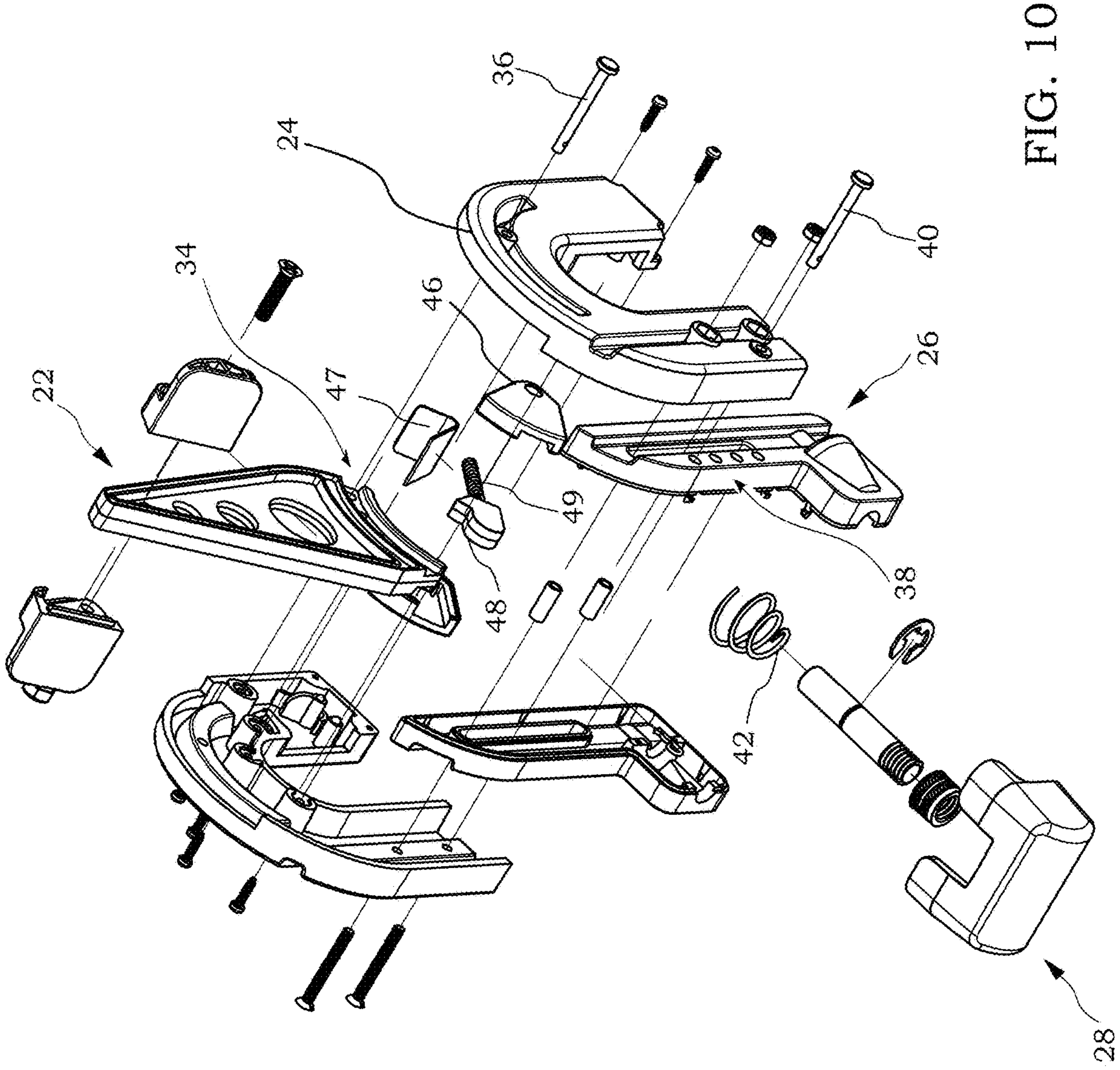
FIG. 10 is an enlarged exploded perspective view of the container lid support.

FIG. 9 is a right side view of the support, showing features of one embodiment in alternate positions of use. FIG. 10, an exploded perspective view of the support, shows details of exemplary position adjustment mechanisms. Arm 22 may be adjustably positionable to support the lid at different angles, for example position 22A of about 20° offset from vertical (e.g., dashed vertical line) or position 22B (dot-dash lines) of about 60-70° offset from vertical. The shown adjustment mechanism includes a plurality of holes 34 in a lower end of the arm, and a pin 36 used to hold the arm in one of the discrete positions provided by holes 34 (see also FIG. 11B). The number of holes 34 and spacing therebetween may be selected to provide a range of angular positions of the arm 22 and an adjustment increment within that range (e.g., the arm 22 may be adjustable over a range of angles between about 20° degrees and about 60° degrees, about 30° to about 60°, or other ranges; the position may be incrementally adjusted in increments of about 5°, about 10°, about 20°, or another increment).

In another embodiment, the angle of arm 22 may be continuously adjustable and held in a selected position with a nut and bolt, a set screw, or similar fastener. To facilitate continuous adjustment, the connection between arm 22 and body 24 may include friction-based or mechanical locking mechanisms. In some aspects, a pivot joint between the arm and the body may incorporate a friction washer or bushing positioned between the arm and body to provide resistance during adjustment while allowing manual repositioning. The friction element may be made of materials such as nylon, rubber, or metal with appropriate surface treatments to achieve the desired resistance level. In another example, the continuous adjustment mechanism may include a threaded fastener system. A bolt or screw may pass through the pivot point, with a nut or threaded receiver on the opposite side. Tightening the fastener may increase clamping force between the arm and body, securing the arm in the selected angular position. Loosening the fastener reduces the clamping force, allowing the arm to be repositioned as desired. Other adjustment mechanisms for the arm are also or instead possible. Some embodiments may include graduated markings or indicia on the body or arm to assist users in selecting and repeating specific angular positions. These markings may indicate common angles such as 30°, 45°, or 60° from vertical, though the mechanism may allow positioning at any angle within the available range.

Figures 11A, 11B:
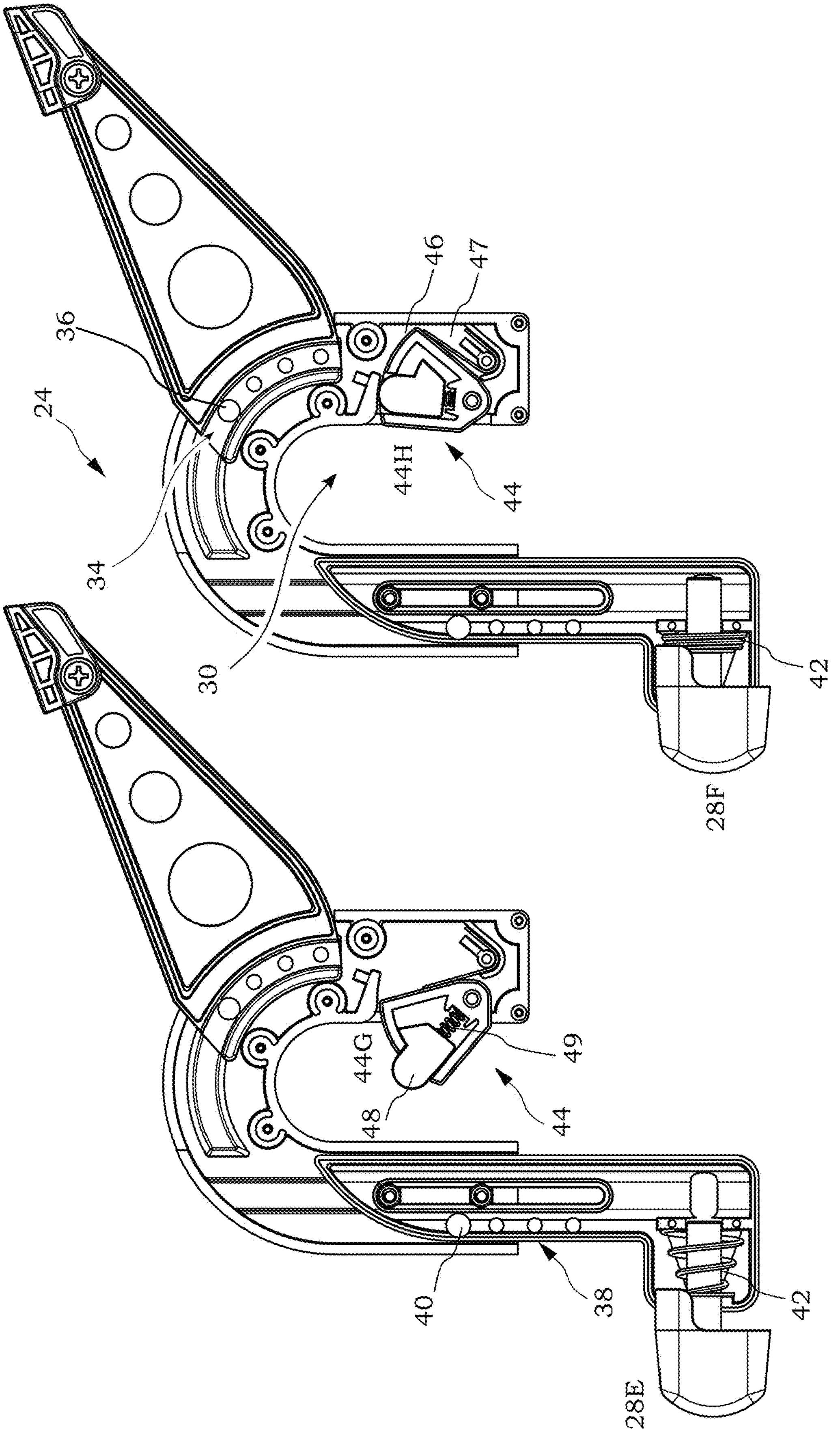
FIGS. 11A & 11B are side views of the container lid support in alternate positions.

As shown in FIG. 9, leg 26 may be downwardly extensible to accommodate different sizes and configurations of container (e.g., different heights between the handle and the upper rim of the rear side of the container). Alternate positions 26C and 26D (dot-dash lines) are shown. The position adjustment mechanism for leg 26 is similar to that described above for the arm. FIG. 10 shows a plurality of holes 38 and a pin 40 for retaining the leg in one of the discrete positions permitted by holes 38. A continuous adjustment mechanism may instead be used for positioning the leg. For example, the leg may extend from the body by sliding downwardly therefrom, and may be engaged with a track, slot, or similar within the body. The leg may be held in a desired position by tightening a fastener that joins the leg to the body In the FIG. 9 embodiment, foot 28 is forwardly adjustable. This feature accommodates containers having different distances between the back and the handle (e.g., by changing the distance between front of foot 28 and the front of recess 30). Alternate positions 28E and 28F (dot-dash lines) of foot 28 are shown. FIGS. 11A and 11B show side views of the support with some external components removed to reveal the internal mechanisms. Foot 28 is shown in connection with a spring 42 which may be compressed, e.g. by hand, to position the foot in position 28F. Spring 42, when not under compression, will bias foot 28 as far as possible toward position 28E. In this manner, the foot may automatically extend to contact back 504 of the container.

FIGS. 11A & 11B show a retaining mechanism 44 used to hold body 24 in place on the handle. This feature may prevent inadvertent disengagement of the device from the trash can, such as may occur when the container is lifted and dumped by a sanitation vehicle. The shown mechanism includes a lever 46 in contact with a v-spring 47, and a plunger 48 connected to a compression spring 49 (see also FIG. 10). When springs 47 and 49 are not under compression, mechanism 44 defaults to position 44G, shown in FIG. 11A. When in position 44G mechanism 44 retains the support in position on handle 506 (as may be seen in FIG. 2). To release mechanism 44, a user may depress plunger 48 (compressing spring 49) and push lever 46 backward into body 24 (compressing spring 47). In the second position 44H, shown in FIG. 11B, the lever 46 is at least partially retracted into body 24, permitting removal of the support from the handle.

Figure 14:
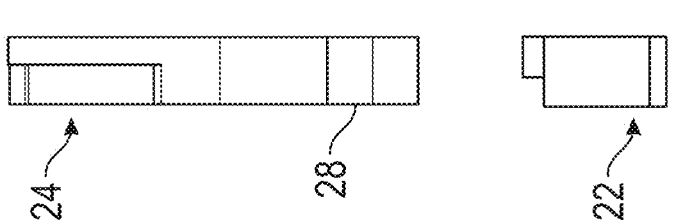
FIG. 14 is an exploded rear view of the container lid support.
Figure 13:
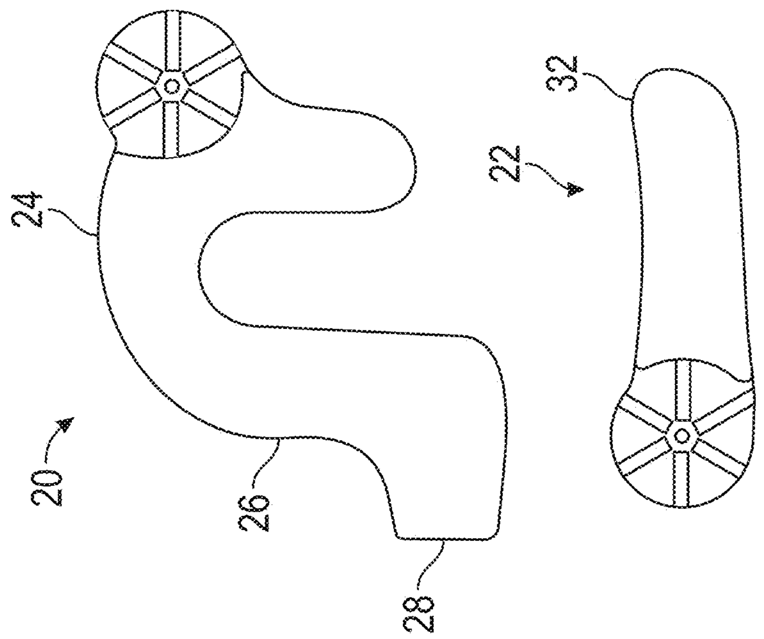
FIG. 13 is an exploded right side view of the container lid support.
Figure 12:
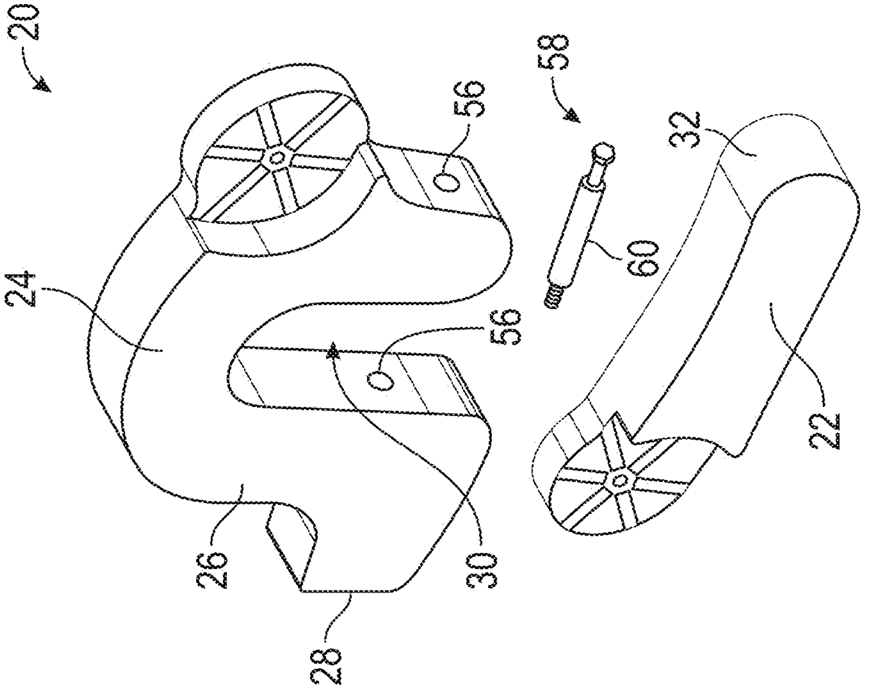
FIG. 12 is an exploded perspective view of another embodiment of the container lid support.
Figure 15:
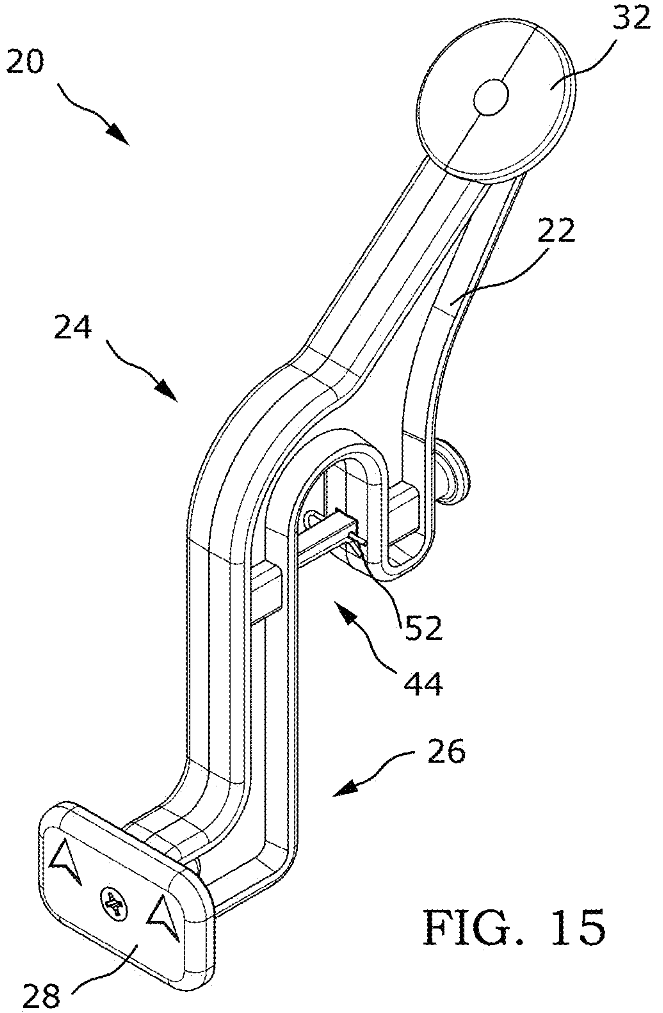
FIG. 15 is a front perspective view of another embodiment of the container lid support.
Figure 16:
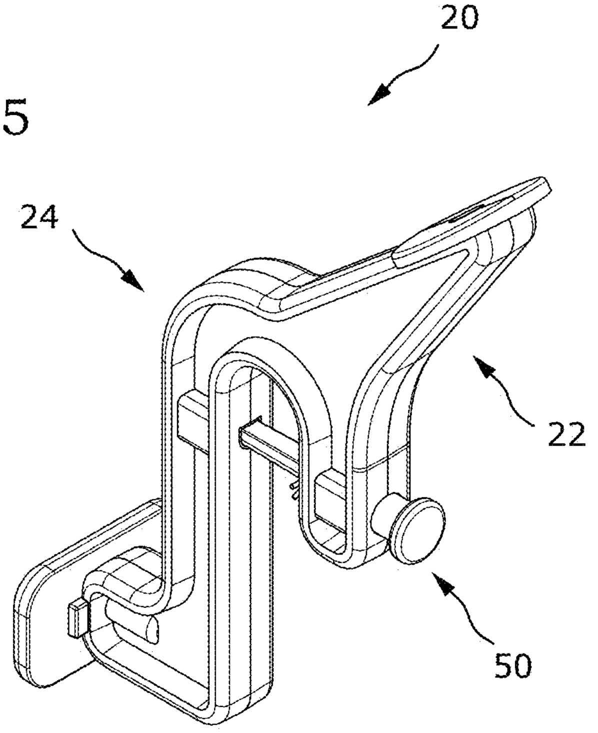
FIG. 16 is a rear perspective view of the container lid support.
Figure 25:
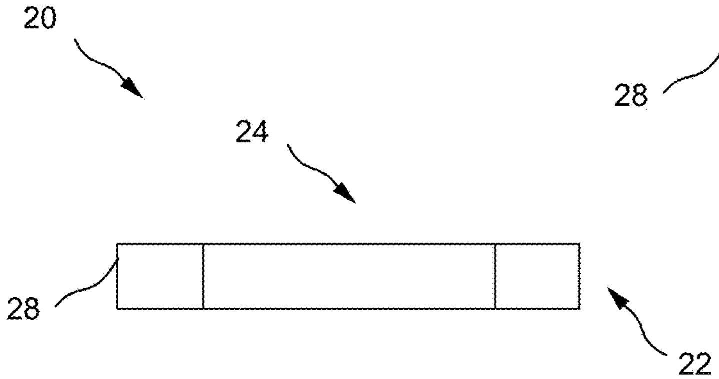
FIG. 25 is a top view of the container lid support.
Figure 22:
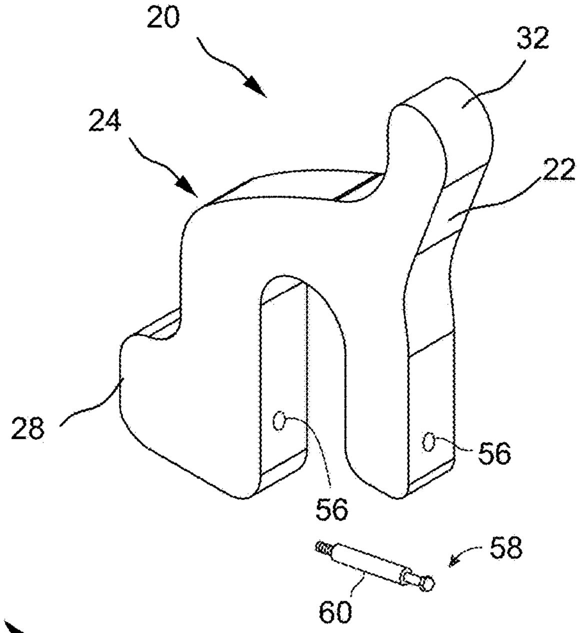
FIG. 22 is a perspective view of another embodiment of the container lid support.
Figure 23:
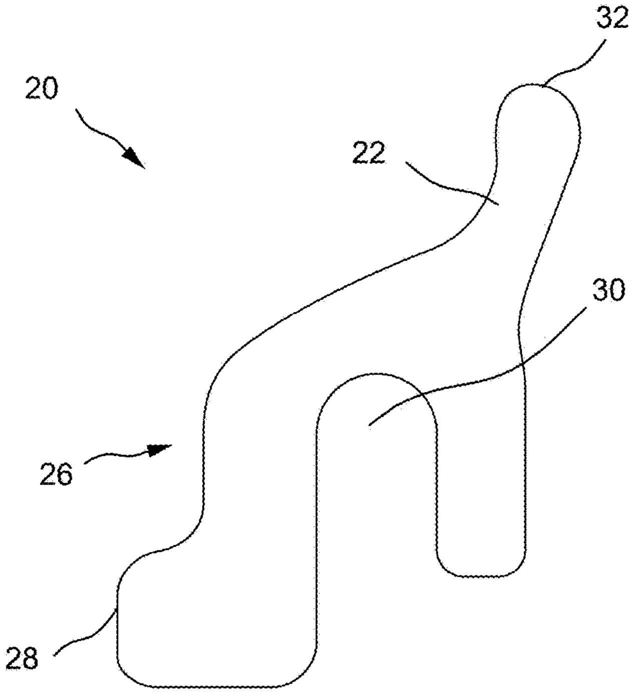
FIG. 23 is a right side view of the container lid support, the left side view being substantially a mirror image.
Figure 24:
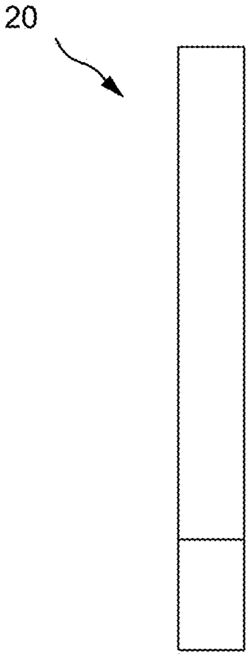
FIG. 24 is a rear view of the container lid support.

FIGS. 12-14 are, respectively, exploded perspective, right side, and rear views of a second embodiment of the support, wherein like parts are referenced with like numerals. In the shown embodiment body 24 and leg 26 are unitarily formed. Body 24 may be retained on the container by a fastener 58 (e.g., a bolt, pin, or the like) inserted through holes 56 of body 24. A spacer 60 may optionally be included. Arm 22 may be connected to body 24 by a pin, bolt, screw, or other fastener through the holes shown in the arm and body. The angular position of the arm may be adjusted by loosening the fastener, rotating arm 22 about the thru hole, and tightening the fastener, thereby moving arm end 32 between substantially vertical and substantially horizontal positions. Arm end 32 may be padded or reinforced. Either, or both, of body 24 and arm 22 may include detents configured to maintain a specific angle between body 24 and arm 22 (e.g., 90, 135, or 180 degrees as shown, or another angle).

FIGS. 15-21 are, respectively, front and rear perspective, left side, front, rear, top and bottom views of a third embodiment of the support, wherein like parts are referenced with like numerals. In the shown embodiment, body 24, arm 22, arm end 32, and leg 26 are unitarily formed. Arm 22 is positioned at a fixed angle of approximately 50° offset from vertical. Arm end 32 may be padded or reinforced.

The third embodiment includes a retaining mechanism 44 which has a rod 50 for insertion into body 24. The rod is held in place by a pin 52 which may be readily removed to take the support off of the container handle. In embodiments, rod 50 includes at least a plastic exterior which permits smooth rotation of support 20 about the handle.

FIGS. 22-25 are, respectively, perspective, right side, rear, and top views of a fourth embodiment of the support, wherein like parts are referenced with like numerals. In the shown embodiment, body 24, arm 22, leg 26, and foot 28 are unitarily formed. Arm 22 supports a container lid; a separate arm end 32 is not included. The shown embodiment may be retained on the container by a fastener 58 (e.g., a bolt, pin, or the like) inserted through holes 56 of body 24. A spacer 60 may be used to prevent over-tightening of fastener 58 which could put stress on body 24.

The geometry of any embodiments of the support may enable secure retention on the container through the interaction of multiple structural elements working in combination. The U-shaped recess 30 in body 24 may be dimensioned to create a close fit around the cylindrical handle 506. The positioning of leg 26 and foot 28 may create a three-point contact system that resists movement in multiple directions. When foot 28 contacts back 504 of the container, it may create a reaction force that presses body 24 more firmly against handle 506. This contact point may also prevent the support from sliding laterally along the handle or rotating excessively about the handle axis.

In addition, or instead, the angular relationship between arm 22 and leg 26 may create a mechanical advantage that enhances retention. As arm 22 extends rearwardly and upwardly while leg 26 extends downwardly and forwardly, these components may form a triangulated structure that distributes loads and resists displacement. When a lid contacts arm end 32, the resulting force may be transmitted through the support structure in a way that increases the contact pressure between recess 30 and handle 506.

The overall width and profile of the support may be configured to create a close fit with surrounding container features. In some aspects, the support dimensions may be selected so that removal requires a specific orientation or sequence of movements, making inadvertent disengagement unlikely during normal use. The support may be designed with slight flexibility in certain areas, allowing it to deform slightly during installation but return to a shape that creates secure engagement with the container.

In some embodiments, the internal surfaces of recess 30 may include subtle ridges, textures, or slight undercuts that engage with corresponding features on the handle surface. These features may be small enough to avoid damage to the container while providing additional retention force through mechanical interlocking.

The structural components of the support may be designed to withstand repeated use and environmental conditions typical of outdoor waste container applications. Materials such as stainless steel, aluminum, or plastics may be employed to ensure long-term functionality and durability.

Figure 26:
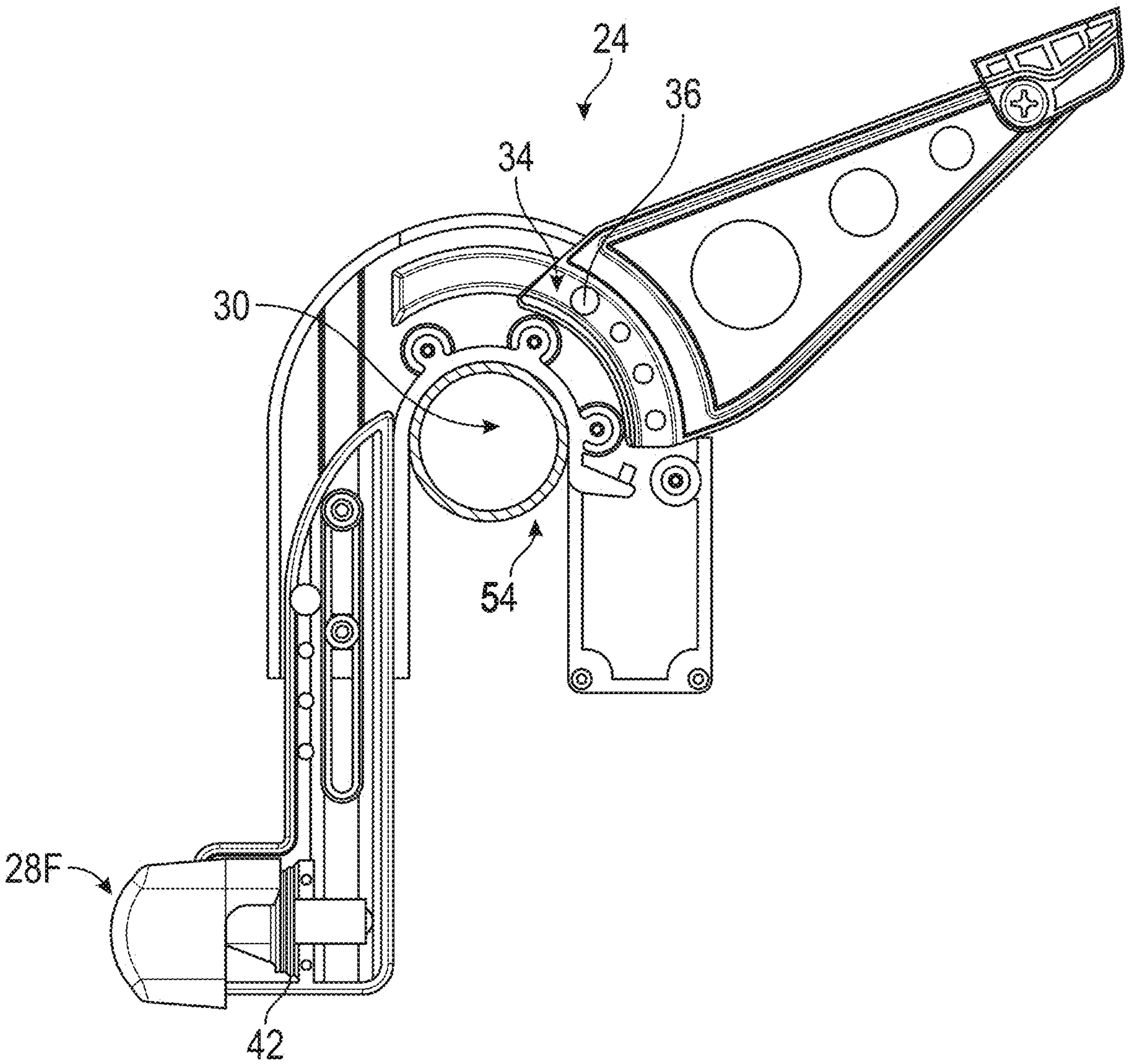
FIG. 26 is side view of a container system.

FIG. 26 is side view of a container system, including a container lid support (which may be substantially as shown and described in any of the embodiments disclosed herein). Body 24 of the support may include a sleeve 54 shaped and dimensioned to receive a handle of the container. By inserting the handle through sleeve 54, the support may be installed on the container in a semi-permanent manner so to not be readily removable from the container. The container system may include any container as described herein, such as, e.g., the container 500 of FIG. 1.

In terms of use, a method for of supporting a lid 502 of a container 500 may include: (refer to FIGS. 1-26)

(a) providing a container lid support 20 connected to a handle 506 of the container with an arm 22 of the support extending upwardly and a leg 26 of the support extending downwardly;

(b) contacting a back 504 of the container with a foot 28 of the support;

(c) pivoting the lid about the handle into an open position; and (d) bringing the lid in contact with an arm end 32 located on a distal end of the arm, thereby supporting the lid of the container in the open position.

The method may further include connecting the container lid support to the handle by: positioning the support in a first orientation with the arm projecting toward a first side of the container and the foot projecting toward an opposing second side of the container; passing the support in the first orientation between the handle and the back of the container; rotating the support into a second orientation with the arm projecting toward a rear of the container and the foot projecting toward a front of the container; and receiving the handle within a recess of the support.

Any of the methods discussed herein may further include: rotating the support about the handle to contact the lid with the lid in a closed position.

Any of the methods discussed herein may further include: adjusting the position of the arm over a range of angles offset rearwardly from a vertical direction.

Any of the methods discussed herein may further include: adjusting the position of the foot in a lateral direction.

Any of the methods discussed herein may further include: adjusting the position of the leg to change a length of the leg.

The embodiments of the container support, systems, and methods of use described herein are exemplary and numerous modifications, combinations, variations, and rearrangements can be readily envisioned to achieve an equivalent result, all of which are intended to be embraced within the scope of the appended claims. Further, nothing in the above-provided discussions of the container support, systems, and methods of use should be construed as limiting the invention to a particular embodiment or combination of embodiments. The scope of the invention is defined by the appended claims.

I claim:

1. A container lid support configured for attachment to a cooperating container having a handle, a lid, and a back, the container lid support comprising:

a body having a recess shaped and dimensioned to receive the handle of the container;

an arm extending upwardly from the body and angled rearwardly away from a vertical direction;

an arm end located on a distal end of the arm, the arm end structurally configured to contact and support the lid of the container when the lid is in an open position;

a leg extending downwardly from the body; and a foot projecting forwardly from a distal end of the leg, the foot configured to contact the back of the container;

wherein the foot is adjustably positionable in a lateral direction to contact the back of the container and wherein the foot includes a biasing mechanism configured to extend the foot to contact the back of the container.

2. The container lid support of claim 1, wherein the arm is adjustably positionable over a range of angles offset rearwardly from the vertical direction.

3. The container lid support of claim 2, wherein the arm is adjustably positionable continuously over the range of angles.

4. The container lid support of claim 2, wherein the arm is adjustably positionable to a plurality of discrete positions within the range of angles.

5. The container lid support of claim 4, wherein the arm includes a plurality of holes at a lower end thereof, each of the plurality of holes being configured to receive a pin for adjustably positioning the arm at the plurality of discrete positions.

6. The container lid support of claim 4, wherein the body includes detents configured to engage with the arm for adjustably positioning the arm at the plurality of discrete positions.

7. A container lid support configured for attachment to a cooperating container having a handle, a lid, and a back, the container lid support comprising:

a body having a recess shaped and dimensioned to receive the handle of the container;

an arm extending upwardly from the body and angled rearwardly away from a vertical direction;

an arm end located on a distal end of the arm, the arm end structurally configured to contact and support the lid of the container when the lid is in an open position;

a leg extending downwardly from the body;

a foot projecting forwardly from a distal end of the leg, the foot configured to contact the back of the container; and a retaining mechanism located on the body, the retaining mechanism including a lever positionable to a first position at least partially blocking the recess and a second position wherein the lever is at least partially retracted into the body and the recess is sufficiently open for the handle to pass therethrough.

8. The container lid support of claim 1, wherein the leg is adjustably positionable to change a length thereof.

9. The container lid support of claim 8, wherein the leg includes a plurality of holes configured to receive a pin for adjustably positioning the leg at discrete lengths.

10. The container lid support of claim 1, wherein the recess is substantially U-shaped and dimensioned to closely receive the handle.

11. The container lid support of claim 1, wherein the body is rotatably positionable about the handle when attached thereto.

12. The container lid support of claim 1, wherein the body, the arm, and the leg create a unitarily formed structure.

13. The container lid support of claim 1, wherein the support has a maximum width smaller than a passage width defined between the handle and the back of the container.

14. A container system including:

a container having a handle, a lid, and a back, the lid pivotable about the handle to an open position;

a container lid support including:

a body having a recess shaped and dimensioned to receive the handle;

an arm extending upwardly from the body and angled rearwardly away from a vertical direction;

an arm end located on a distal end of the arm, the arm end structurally configured to contact and support the lid of the container when the lid is in the open position;

a leg extending downwardly from the body; and a foot projecting forwardly from a distal end of the leg and in contact with the back of the container;

wherein the foot is adjustably positionable in a lateral direction to contact the back of the container and wherein the foot includes a biasing mechanism configured to extend the foot to contact the back of the container.

15. The container lid support of claim 7, wherein the arm is adjustably positionable over a range of angles offset rearwardly from the vertical direction.

16. The container lid support of claim 7, wherein the leg is adjustably positionable to change a length thereof.

17. The container lid support of claim 7, wherein the recess is substantially U-shaped and dimensioned to closely receive the handle.

18. The container lid support of claim 7, wherein the body is rotatably positionable about the handle when attached thereto.

19. The container lid support of claim 7, wherein the body, the arm, and the leg create a unitarily formed structure.

20. The container lid support of claim 7, wherein the support has a maximum width smaller than a passage width defined between the handle and the back of the container.

* * * * *